United States Patent
Yang et al.

(10) Patent No.: US 10,475,589 B2
(45) Date of Patent: Nov. 12, 2019

(54) TANTALUM CAPACITOR INCLUDING AN ANODE LEAD FRAME HAVING A BENT PORTION AND METHOD OF MANUFACTURING THE SAME

(71) Applicant: SAMSUNG ELECTRO-MECHANICS CO., LTD., Suwon-si, Gyeonggi-do (KR)

(72) Inventors: Wan Suk Yang, Suwon-si (KR); Hong Kyu Shin, Suwon-si (KR); Kyoung Sup Choi, Suwon-si (KR); Woo Sung Lee, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/863,211

(22) Filed: Jan. 5, 2018

(65) Prior Publication Data
US 2018/0144875 A1 May 24, 2018

Related U.S. Application Data

(63) Continuation of application No. 14/885,932, filed on Oct. 16, 2015, now abandoned.

(30) Foreign Application Priority Data

Nov. 7, 2014 (KR) .................. 10-2014-0154288

(51) Int. Cl.
*H01G 9/012* (2006.01)
*H01G 9/15* (2006.01)
(Continued)

(52) U.S. Cl.
CPC ............. *H01G 9/012* (2013.01); *H01G 9/10* (2013.01); *H01G 9/15* (2013.01); *H01G 9/0029* (2013.01)

(58) Field of Classification Search
CPC ........... H01G 9/15; H01G 9/10; H01G 9/012; H01G 9/0029
See application file for complete search history.

(56) References Cited

U.S. PATENT DOCUMENTS

2002/0167786 A1* 11/2002 Sano ..................... H01G 9/012
361/509
2004/0052033 A1 3/2004 Sano et al.
(Continued)

FOREIGN PATENT DOCUMENTS

JP    02106014 A  *  4/1990
JP    02106022 A  *  4/1990
(Continued)

OTHER PUBLICATIONS

U.S. Non-final Office Action dated Nov. 6, 2017 issued in U.S. Appl. No. 14/885,932.
(Continued)

*Primary Examiner* — David M Sinclair
(74) *Attorney, Agent, or Firm* — Morgan, Lewis & Bockius LLP

(57) ABSTRACT

A tantalum capacitor includes a capacitor body; a tantalum wire protruding from one surface of the capacitor body; a molded part enclosing the capacitor body and the tantalum wire; an anode lead frame connected to the tantalum wire and exposed to an outer surface of the molded part; and a cathode lead frame disposed on an outer surface of the capacitor body and exposed to the outer surface of the molded part. The anode lead frame includes a bend portion.

11 Claims, 18 Drawing Sheets

(51) Int. Cl.
*H01G 9/10* (2006.01)
*H01G 9/00* (2006.01)

(56) References Cited

U.S. PATENT DOCUMENTS

| | | | |
|---|---|---|---|
| 2009/0147449 A1* | 6/2009 | Matsuoka | H01G 9/012 361/540 |
| 2009/0231784 A1 | 9/2009 | Matsuoka et al. | |

FOREIGN PATENT DOCUMENTS

| JP | 07335493 A | * | 12/1995 |
| JP | 2002-299165 A | | 10/2002 |
| JP | 2003109849 A | * | 4/2003 |
| JP | 2005-079357 A | | 3/2005 |
| JP | 2005-228801 A | | 8/2005 |
| JP | 2006-253367 A | | 9/2006 |
| JP | 2009065140 A | * | 3/2009 |
| JP | 2009-130155 A | | 6/2009 |
| JP | 2009-218502 A | | 9/2009 |
| JP | 2010-225696 A | | 10/2010 |
| JP | 2011-077079 A | | 4/2011 |
| JP | 2011249708 A | * | 12/2011 |
| JP | 2012-044215 A | | 3/2012 |
| JP | 2014-204059 A | | 10/2014 |
| KR | 10-2007-0017738 A | | 2/2007 |
| KR | 10-2014-0021256 A | | 2/2014 |

OTHER PUBLICATIONS

Machine Translation of Japanese Patent Application No. 2006-254467 (published Sep. 21, 2006).
Machine translation of Japanese Patent Application No. 2010-225696 (published Oct. 7, 2010).
Machine translation of Japanese Patent Application No. 2009-130155 (published Jun. 11, 2009).
U.S. Final Office Action dated Jul. 27, 2017 issued in U.S. Appl. No. 14/885,932.
U.S. Non-final Office Action dated Apr. 27, 2017 issued in U.S. Appl. No. 14/885,932.
Office Action issued in corresponding Korean Application No. 10-2014-0154288, dated Jun. 26, 2019.

* cited by examiner

TANTALUM CAPACITOR INCLUDING AN ANODE LEAD FRAME HAVING A BENT PORTION AND METHOD OF MANUFACTURING THE SAME

CROSS-REFERENCE TO RELATED APPLICATION

This application is Continuation Patent Application of U.S. patent application Ser. No. 14/885,932, filed on Oct. 16, 2015 which claims the benefit of priority to Korean Patent Application No. 10-2014-0154288, filed on Nov. 7, 2014 with the Korean Intellectual Property Office, the entireties of which are incorporated herein by reference.

BACKGROUND

The present disclosure relates to a tantalum capacitor and a method of manufacturing the same.

Tantalum (Ta) is a metal widely used in various fields, such as the aerospace and defense sectors, as well as in the electrical, electronic, mechanical, chemical and other fields, due to its desirable mechanical and physical properties, such as high melting point, excellent flexibility and corrosion-resistance, and the like.

Since tantalum may allow for the formation of a stable anodic oxide film, it has been widely used as an anode material in small capacitors. In accordance with the rapid development of information technology (IT), as well as the further development of the electronics and communications industries, the amount of tantalum used worldwide has increased by 10% on an annual basis.

A capacitor is generally referred to as an electric condenser in which electricity is temporarily stored. It is a component that may accumulate electricity through two flat plate electrodes which are insulated from each other by a dielectric layer interposed therebetween and that are in close proximity to each other so as to accumulate electric charges by attraction. In this way, it may be used to obtain capacitance by confining the electric charges and an electric field to a space enclosed by two conductors.

A tantalum capacitor using the tantalum material may have a structure using gaps generated when tantalum powder particles are sintered and solidified. It is completed by forming a layer of tantalum oxide ($Ta_2O_5$) on a surface thereof using an anodizing method, as well as forming a manganese dioxide ($MnO_2$) layer and a polymer layer, which are electrolytes, on the tantalum oxide, using the tantalum oxide as a dielectric layer. Then, a carbon layer and a metal layer are formed on the manganese dioxide layer as well as the polymer layer to form a body, anode and cathode lead frames are formed, and a molded part on the body in order is formed to allow the tantalum capacitor to be mounted on a printed circuit board (PCB).

In order to connect a tantalum wire of the tantalum capacitor to an electrode of the board on which the tantalum capacitor is mounted, the tantalum wire needs to be connected to the anode lead frame. In this case, in order to bond the anode lead frame and the tantalum wire to each other, a riser is welded to the anode lead frame. However, as the tantalum capacitor is miniaturized, the defect rate from the welding process is increased and manufacturing costs are increased.

SUMMARY

An aspect of the present disclosure may provide a tantalum capacitor in which the occurrence of defects may be reduced, product properties may be improved, manufacturing costs may be decreased, and a product may be miniaturized due to a simple manufacturing process by forming an anode lead frame without a welding process and integrally forming the anode lead frame and a cathode lead frame.

According to an aspect of the present disclosure, a tantalum capacitor comprises a capacitor body; a tantalum wire protruding from one surface of the capacitor body; a molded part enclosing the capacitor body and the tantalum wire; an anode lead frame connected to the tantalum wire and exposed to an outer surface of the molded part; and a cathode lead frame disposed on an outer surface of the capacitor body and exposed to the outer surface of the molded part, wherein the anode lead frame includes a bend portion.

The bend portion may have an acute angle of 80° or less.

The bend portion may be disposed to be closer to the capacitor body than a portion in which the anode lead frame and the tantalum wire are connected, on the basis of a length direction of the capacitor body.

The tantalum capacitor may further comprise a support portion disposed on a surface of the anode lead frame.

The support portion may be disposed on at least one surface of a surface of the anode lead frame disposed in a width-length plane of the capacitor body and a surface of the anode lead frame forming an acute angle with the surface disposed in the width-length plane of the capacitor body, among surfaces of the anode lead frame forming the acute angle.

The support portion may be in contact with both the surface of the anode lead frame disposed in the width-length plane of the capacitor body and the surface of the anode lead frame forming the acute angle with the surface disposed in the width-length plane of the capacitor body.

The tantalum capacitor may further comprise a groove portion disposed in the anode lead frame.

According to another aspect of the present disclosure, a method of manufacturing a tantalum capacitor may comprise steps of: preparing a conductive thin plate; cutting and compressing the conductive thin plate to form a pre-anode lead frame and a cathode lead frame; forming an anode lead frame having a bend portion by bending the pre-anode lead frame to form the bend portion; mounting a capacitor body on the anode lead frame and the cathode lead frame, the capacitor body having a tantalum wire protruding from one surface; and forming a molded part to enclose the capacitor body and the tantalum wire.

In the step of cutting and compressing the conductive thin plate to form the pre-anode lead frame and the cathode lead frame, the pre-anode lead frame and the cathode lead frame may be simultaneously formed by a single process.

In the step of forming the anode lead frame having the bend portion by bending the pre-anode lead frame to form the bend portion, the pre-anode lead frame may be bent so that an acute angle formed in the bend portion is 80° or less.

The step of mounting the capacitor body on the anode lead frame and the cathode lead frame may include aligning the bend portion to be closer to the capacitor body than a portion in which the anode lead frame and the tantalum wire are connected, on the basis of a length direction of the capacitor body.

The step of cutting and compressing the conductive thin plate to form the pre-anode lead frame and the cathode lead frame may include forming a support portion exposed to one surface of the pre-anode lead frame.

The step of cutting and compressing the conductive thin plate to form the pre-anode lead frame and the cathode lead frame may include forming a groove portion in the pre-anode lead frame.

In the step of forming the groove portion, the groove portion may be formed integrally with the pre-anode lead frame by a single cutting and compressing process forming the pre-anode lead frame and the cathode lead frame.

In the step of forming the anode lead frame having the bend portion by bending the pre-anode lead frame to form the bend portion, the bend portion may be formed by bending a portion of the pre-anode lead frame in which the groove portion is formed.

The step of mounting the capacitor body on the anode lead frame and the cathode lead frame may include bonding the anode lead frame to the tantalum wire.

BRIEF DESCRIPTION OF DRAWINGS

The above and other aspects, features and other advantages of the present disclosure will be more clearly understood from the following detailed description taken in conjunction with the accompanying drawings.

DETAILED DESCRIPTION

Figure 1:
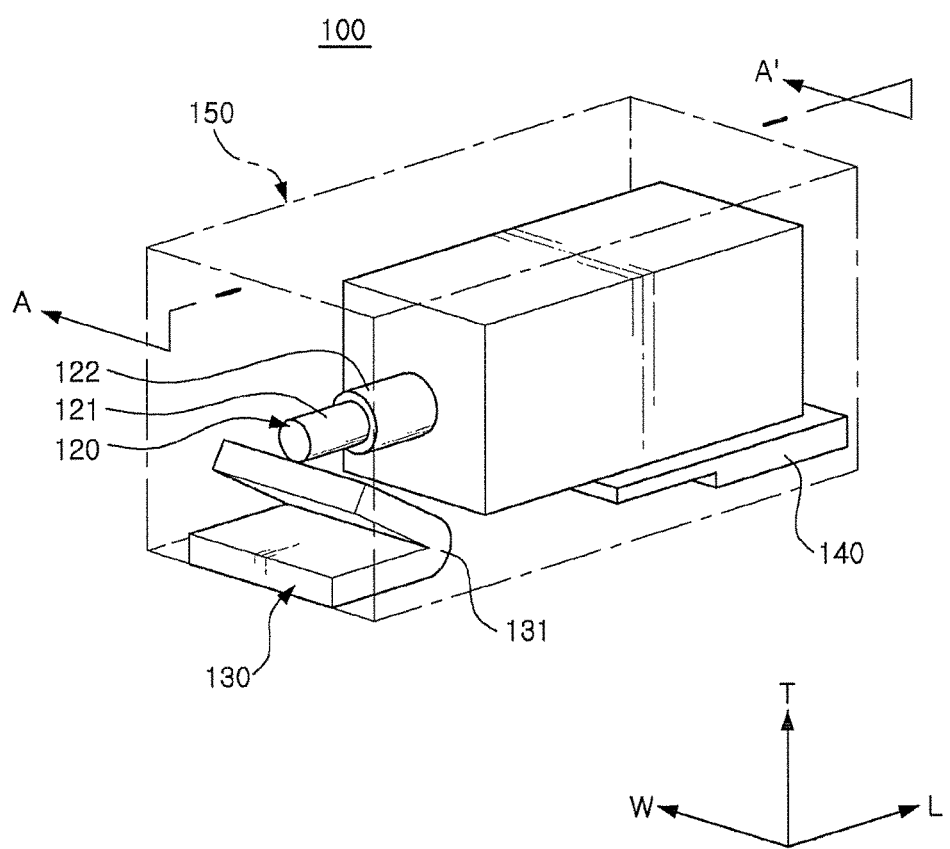
FIG. 1 is a transparent perspective view of a tantalum capacitor according to an exemplary embodiment in the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Tantalum Capacitor

Figure 2:
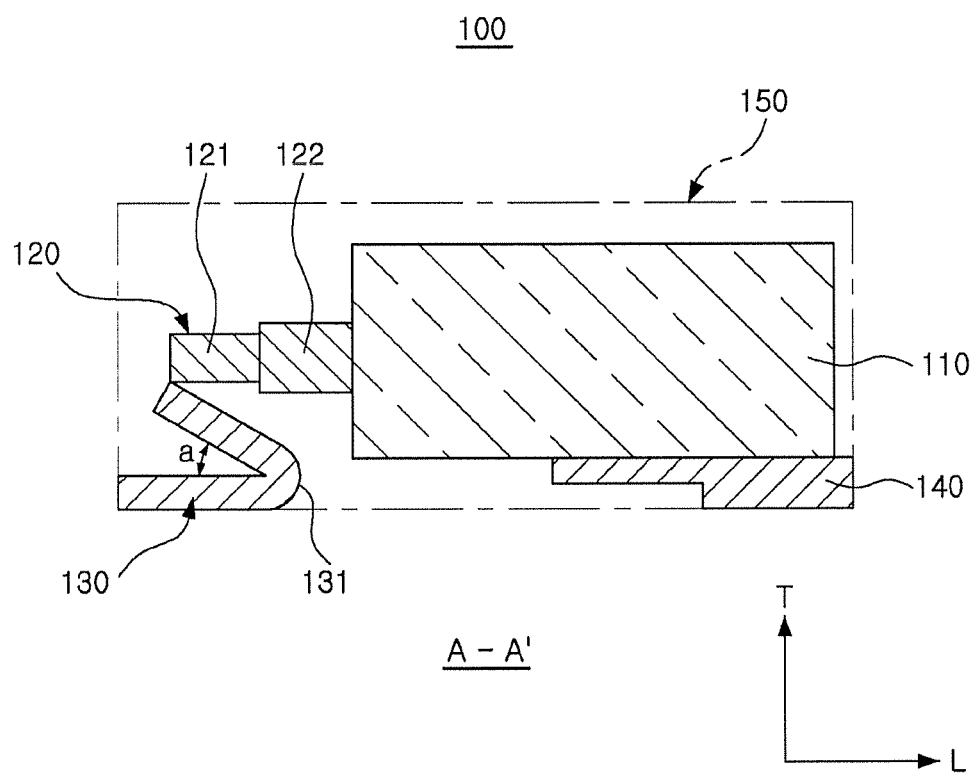
FIG. 2 is a cross-sectional view of the tantalum capacitor taken along line A-A' of FIG. 1.

FIG. 1 is a transparent perspective view of a tantalum capacitor 100 according to an exemplary embodiment in the present disclosure and FIG. 2 is a cross-sectional view of the tantalum capacitor 100 taken along line A-A' of FIG. 1. In FIGS. 1 and 2, a length direction L of the tantalum capacitor 100, a width direction W thereof, and a thickness direction T thereof are defined. Accordingly, the tantalum capacitor 100 according to an exemplary embodiment in the present disclosure will be described.

Referring to FIGS. 1 and 2, the tantalum capacitor 100 may include a capacitor body 110, a tantalum wire 120 protruding from one surface of the capacitor body 110, a molded part 150 disposed to surround the capacitor body 110 and the tantalum wire 120, an anode lead frame 130 connected to the tantalum wire 120 and exposed to one surface of the molded part 150, and a cathode lead frame 140 disposed on one surface of the capacitor body 110 and exposed to one surface of the molded part, wherein the anode lead frame 130 may include a bend portion 131.

The capacitor body 110 may be formed of a tantalum material and may be manufactured, for example, by mixing tantalum powder particles and binders with each other at a predetermined ratio, compressing these mixed powder particles to form a rectangular parallelepiped body, and then sintering the formed rectangular parallelepiped body at a high temperature under high vacuum.

The tantalum wire 120 may protrude from one surface of the capacitor body 110. Referring to FIGS. 1 and 2, the tantalum wire 120 protrudes from one surface of the capacitor body 110 in a length direction of the capacitor body 110, but the present disclosure is not limited thereto.

The tantalum wire 120 may be inserted into and mounted in a mixture of the tantalum powder particles and the binders before compressing the mixed powder particles of the tantalum powder particles and the binders. That is, the capacitor body 110 may be manufactured by inserting and mounting the tantalum wire 120 into the tantalum powder particles mixed with the binders to form a tantalum element having a desired size and then sintering the tantalum element at a temperature of about 1,000 to 2,000° C. under a high vacuum atmosphere ($10^{-5}$ torr or less) for about 30 minutes.

The tantalum wire 120 may have an anode part 121 and a cathode part 122. The anode part 121 of the tantalum wire 120 may be connected to the anode lead frame 130. The cathode part 122 may be disposed to be spaced apart from the anode lead frame 130 so as not to be electrically connected to the anode lead frame 130.

The anode lead frame 130 may be connected to an external power source and serve to allow a current to flow in the anode part 121 of the tantalum wire 120. That is, the anode lead frame 130 may be exposed to one surface of the molded part 150 and may be used as a connection terminal for an electrical connection with other electronic products. To this end, the anode lead frame 130 may be formed of a conductive metal such as a nickel/iron alloy, or the like.

The capacitor body 110 may be connected to the cathode lead frame 140. The cathode lead frame 140 may be spaced apart from the anode lead frame 130 and the anode part 121 of the tantalum wire 120. A portion of the cathode lead frame 140 may be exposed to the outside of the molded part 150 to be used as the connection terminal for forming electrical connections with other electronic products. The cathode lead frame 140 may be formed of a conductive metal, such as a nickel/iron alloy, or the like. The anode lead frame 130 and the cathode lead frame 140 may be disposed to be spaced apart from each other and parallel to each other.

Referring to FIGS. 1 and 2, the anode lead frame 130 and the cathode lead frame 140 may be disposed on a lower surface of the capacitor body 110 so as to be exposed to a lower surface of the tantalum capacitor 100. When the anode lead frame 130 and the cathode lead frame 140 are disposed in such a manner, an area occupied by the anode lead frame 130 and the cathode lead frame 140 in the molded part may be decreased. Thus, an area occupied by the capacitor body 110 may be increased. As a result, a high capacitance tantalum capacitor 100 may be manufactured.

The anode lead frame 130 may include the bend portion 131. The bend portion 131 may correspond to a bent portion of the anode lead frame 130. Since the tantalum wire 120 is disposed to protrude from the surface of the capacitor body 110 in the length direction, the tantalum wire 120 may be disposed to be spaced apart from an outer surface of the tantalum capacitor 100 by a predetermined distance. Thus, since the anode lead frame 130 needs to have a shape allowing for a connection to be formed with the tantalum wire 120 while being exposed to the outer surface of the tantalum capacitor 100 at the same time, a riser extending from the outer surface of the tantalum capacitor 100 to the tantalum wire 120 is required. According to an exemplary embodiment in the present disclosure, the riser may be formed by the bend portion 131. Referring to FIGS. 1 and 2, the anode lead frame 130 may be divided into a portion exposed to the outside of the molded part 150 and a portion connected to the tantalum wire 120 from the bend portion 131, on the basis of the bend portion 131. In this case, the portion connected to the tantalum wire 120 from the bend portion 131 may be defined as the riser.

An anode lead frame of a tantalum capacitor according to the related art is generally formed by cutting and compressing a conductive thin plate to form an electrode plate and bonding a separately manufactured riser to an upper surface of the electrode plate using a welding process. Since the welding process is separately performed, the manufacturing process may be complex and manufacturing costs may be increased. In addition, it may be difficult to accurately fix the riser to a specific position on an upper surface of the electrode plate for a welding, short circuits may occur by an applied welding material, or the like, the riser may be welded to be inclined by the welding material, or the like, it may be difficult to bond a miniaturized riser by the welding process since the riser may also be miniaturized, according to miniaturization of the tantalum capacitor, and the like.

Since the anode lead frame 130 of the tantalum capacitor 100 has the riser formed by bending the conductive thin plate to form the bend portion, a separate welding process for forming the riser is not required. As a result, the manufacturing process may be simplified and manufacturing costs may be reduced. In addition, defects according to the welding process described above may not occur, and a relatively small tantalum capacitor 100 may also be easily manufactured.

The bend portion 131 may have a shape which is bent at a predetermined angle. The angle of the bend portion 131 may be an acute angle of 80° or less. The acute angle is an angle of a portion indicated by reference number a in FIG. 2.

The anode lead frame 130 may be disposed in a manner in which it supports the anode part 121 of the tantalum wire 120 from below. Thus, if the bend portion 131 has a shape in which it is not sufficiently bent, since the anode lead frame 130 may push up the tantalum wire 130, a mounting defect may occur when the capacitor body 110 is mounted. Thus, the capacitor body 110 may be more stably mounted by disposing the bend portion 131 so that the bent angle of the bend portion 131 is the acute angle of 80° or less.

In order to more stably mount the capacitor body 110, the height of the anode lead frame 130 may be important. If the height of the anode lead frame 130 is higher than the height of the tantalum wire 120 protruding from the capacitor body 110, the capacitor body 110 may not be stably mounted. In addition, if the height of the anode lead frame 130 is lower than the height of the tantalum wire 120 protruding from the capacitor body 110, the tantalum wire 120 may not be connected to the anode lead frame 130. Thus, under a condition in which the anode lead frame 130 is disposed so that the acute angle of the bend portion 131 is 80° or less, the height of the anode lead frame 130 may be freely adjusted according to the height of the tantalum wire 120 protruded from the capacitor body 110. As such, in order to adjust the height of the anode lead frame 130, the bending frame 131 may have a completely folded shape, if necessary. In this case, the acute angle of the bend portion 131 may be 0°.

The anode lead frame 130 may be connected to the anode part 121 of the tantalum wire 120, but needs to be insulated from the cathode part 122. If the acute angle a of the bend portion 131 is small, the anode lead frame 130 may be connected to the cathode part 122 of the tantalum wire 120, thereby causing an electrical short circuit. Thus, the bend portion 131 may need to have a shape which is bent at a sufficient angle.

On the basis of a length direction of the capacitor body 110, the bend portion 131 of the anode lead frame 130 may be disposed to be closer to the capacitor body 110 than a portion to which the anode lead frame 130 and the tantalum wire 120 are connected. In this case, the bend portion 131 may be disposed between the tantalum wire 120 and the lower surface of the tantalum capacitor 100. Thereby, since the anode lead frame 130 may be disposed in a narrower space, a high capacitance tantalum capacitor 100 may be provided.

The tantalum capacitor 100 according to an exemplary embodiment in the present disclosure may further include an adhesive for bonding the cathode lead frame 140 and the capacitor body 110 to each other. The adhesive disposed between the cathode lead frame 140 and the capacitor body 110 may be formed of an adhesive including an epoxy-based thermosetting resin, but the present disclosure is not limited thereto.

The capacitor body 110 and the tantalum wire 120 may be surrounded by the molded part 150. Some regions of the anode lead frame 130 and the cathode lead frame 140 may also be disposed in the molded part 150. Some surfaces of the anode lead frame 130 and the cathode lead frame 140 may be formed to be exposed to the outside of the molded part 150.

The molded part 150 may be formed by transfer-molding a resin such as epoxy molding compound (EMC), or the like. The molded part 150 may not only serve to protect the tantalum wire 120 and the capacitor body 110 externally, but also serve to insulate the anode lead frame 130 and the cathode part 122 of the tantalum wire 120 from the capacitor body 10.

Figure 3:
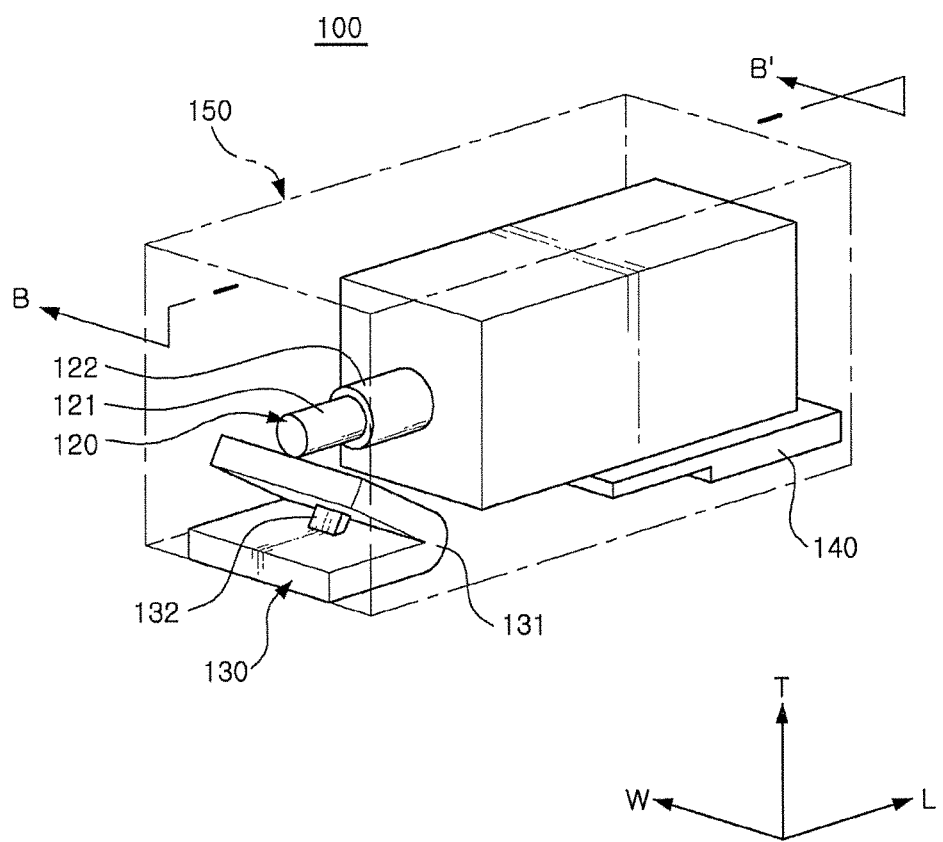
FIG. 3 is a transparent perspective view of a tantalum capacitor according to an exemplary embodiment in the present disclosure.
Figure 4:
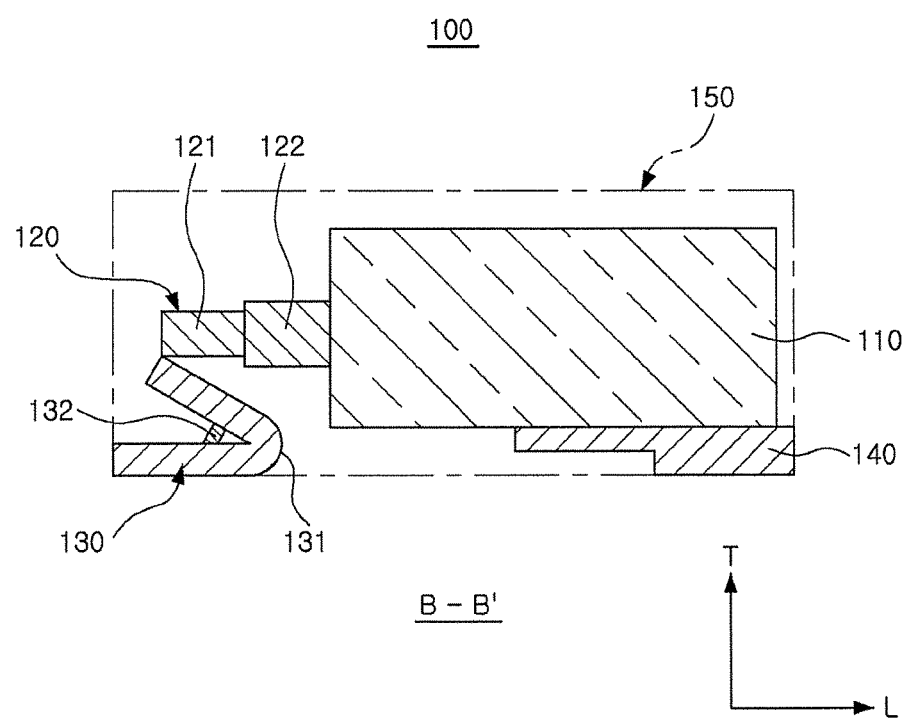
FIG. 4 is a cross-sectional view of the tantalum capacitor taken along line B-B' of FIG. 3.

FIG. 3 is a transparent perspective view of a tantalum capacitor 100 according to another exemplary embodiment in the present disclosure and FIG. 4 is a cross-sectional view of the tantalum capacitor 100 taken along line B-B' of FIG. 3.

Referring to FIGS. 3 and 4, the tantalum capacitor 100 according to another exemplary embodiment in the present disclosure may further include a support portion 132 formed on one surface of the anode lead frame 130.

The support portion 132 may allow the bend portion 131 of the anode lead frame 130 to maintain a shape thereof. The support portion 132 may be disposed on at least one surface of a surface parallel to width-length directions of the capacitor body 110 and a surface forming an acute angle with the surface parallel to the width-length directions of the capacitor body 110, among surfaces of the anode lead frame 130 forming the acute angle by the bend portion 131. When the anode lead frame is divided into two portions on the basis of the bend portion 131, "the surface parallel to a width-length directions of the capacitor body 110" may correspond to a surface forming the acute angle of a portion including a portion exposed to the outside of the molded part 150, and "the surface forming an acute angle with the surface parallel to the width-length directions of the capacitor body 110" may correspond to a surface forming the acute angle of a portion connected to the tantalum wire 120 from the bend portion 131.

When the capacitor body 110 is mounted on the anode lead frame 130, the anode lead frame 130 may be pressed by the tantalum wire 120 of the capacitor body 110. In this case, if the anode lead frame 130 does not have sufficient strength and elasticity, the acute angle of the bend portion 131 may be changed or the anode lead frame 130 may be damaged. As described above, when the support portion 132 is disposed on at least one surface of the surface parallel to the width-length directions of the capacitor body 110 and the surface forming an acute angle with the surface parallel to the width-length directions of the capacitor body 110, among the surfaces of the anode lead frame 130 forming the acute angle by the bend portion 131, since the support portion 132 stably supports the bent surface of the anode lead frame 130, deformation or damage of the anode lead frame 130 may be prevented.

The support portion 132 may be disposed on only one surface of the surface parallel to the width-length directions of the capacitor body 110 and the surface forming the acute angle with the surface parallel to the width-length directions of the capacitor body 110, among the surfaces of the anode lead frame 130 forming the acute angle by the bend portion 131, and may be disposed on both surfaces. In addition, the support portion 132 may be formed to be disposed on any one surface and be in contact with another surface.

Figure 5:
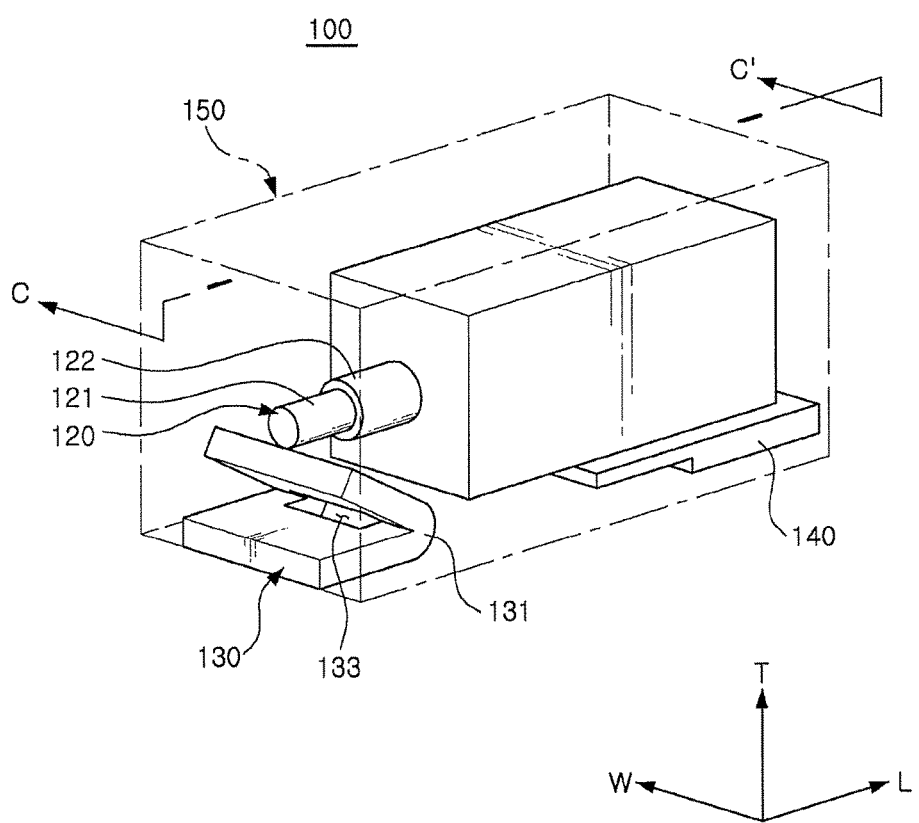
FIG. 5 is a transparent perspective view of a tantalum capacitor according to an exemplary embodiment in the present disclosure.
Figure 6:
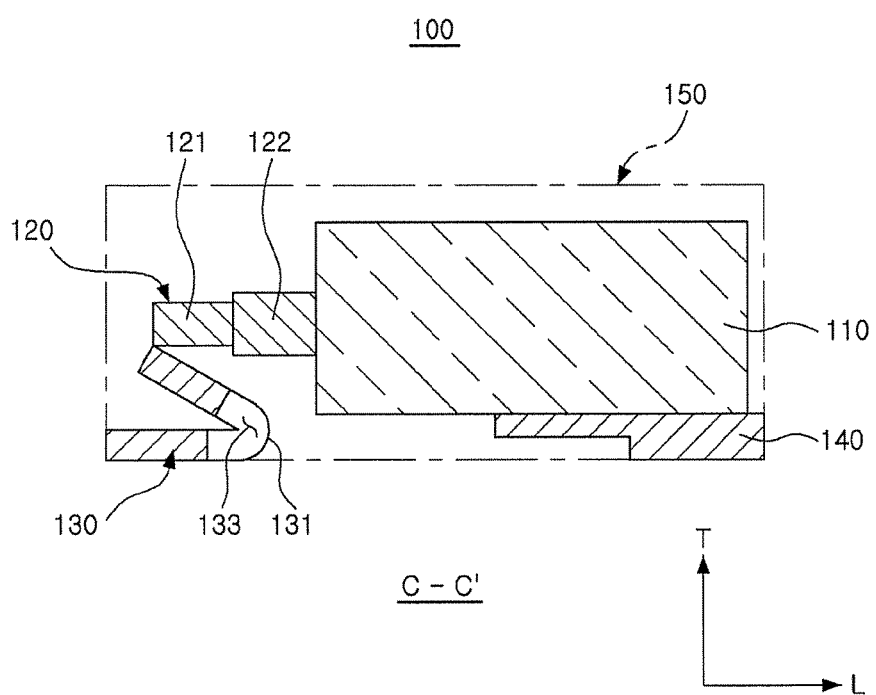
FIG. 6 is a cross-sectional view of the tantalum capacitor taken along line C-C' of FIG. 5.
Figure 7:
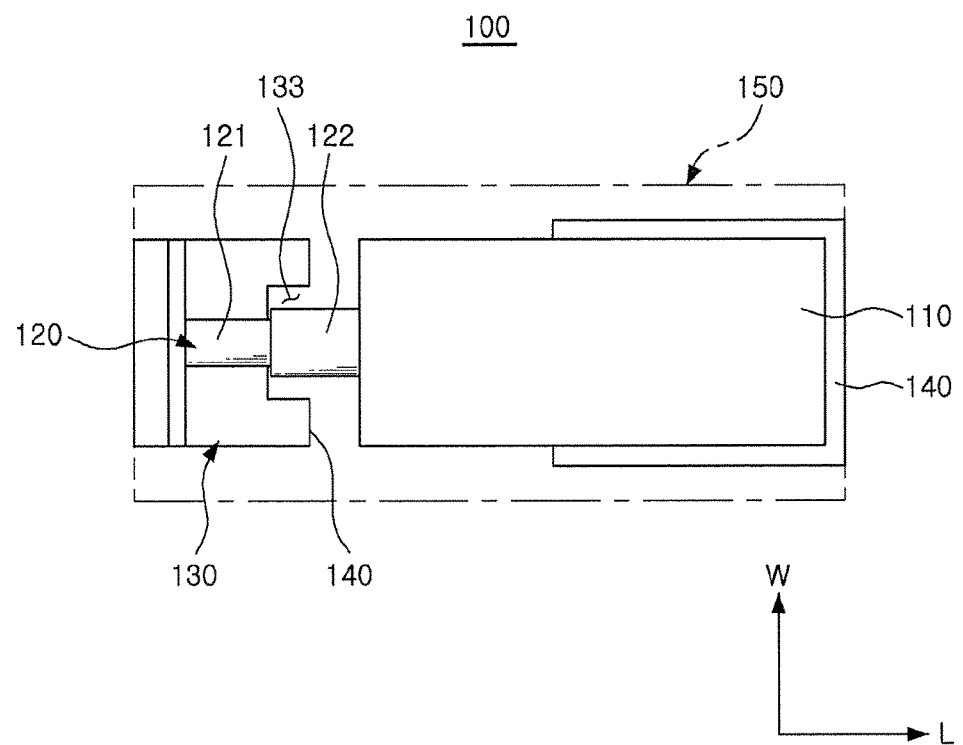
FIG. 7 is a transparent perspective view of the tantalum capacitor of FIG. 5.

FIG. 5 is a transparent perspective view of a tantalum capacitor 100 according to another exemplary embodiment in the present disclosure, FIG. 6 is a cross-sectional view of the tantalum capacitor 100 taken along line C-C' of FIG. 5, and FIG. 7 is a transparent perspective view of the tantalum capacitor 100 of FIG. 5.

Referring to FIGS. 5 through 7, the tantalum capacitor 100 according to another exemplary embodiment in the present disclosure may further include a groove portion 133 in the anode lead frame 130. On the basis of the width-length directions of the capacitor body 110, the groove portion 133 may be disposed in a region overlapped with the tantalum wire 120.

As described above, the anode lead frame 130 may need to be disposed so as not to be electrically connected to the cathode part 122 of the tantalum wire 120. When the bend portion 131 is disposed too close to the capacitor body 110, since the riser of the anode lead frame 130 is disposed to be inclined with respect to the tantalum wire 120, the anode lead frame 130 and the cathode part 122 of the tantalum wire 120 may be electrically connected. The groove portion 133 is disposed in a portion in which the anode lead frame 130 is connected to the cathode part 122 of the tantalum wire 120, whereby short circuits may be prevented. In addition, the groove portion 133 may strengthen the anode lead frame 130.

Referring to FIG. 7, when seen on the width-length plane of the capacitor body 110, the groove portion 133 is disposed in a portion in which the cathode part 122 of the tantalum wire 120 is disposed, whereby short circuits may more effectively prevented. That is, the groove portion 133 may be disposed in the region overlapped with the tantalum wire 120 and may be disposed to be greater than a width of the tantalum wire 120, whereby short circuits may be more stably prevented.

Figure 8:
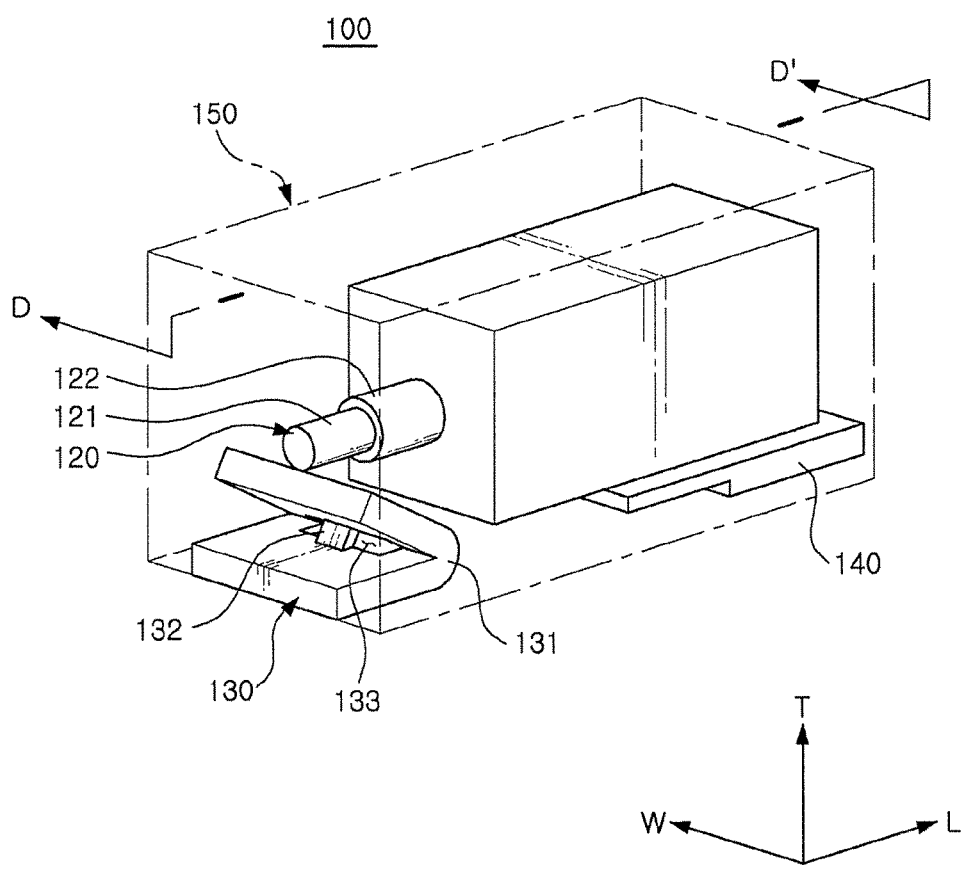
FIG. 8 is a transparent perspective view of a tantalum capacitor according to an exemplary embodiment in the present disclosure.
Figure 9:
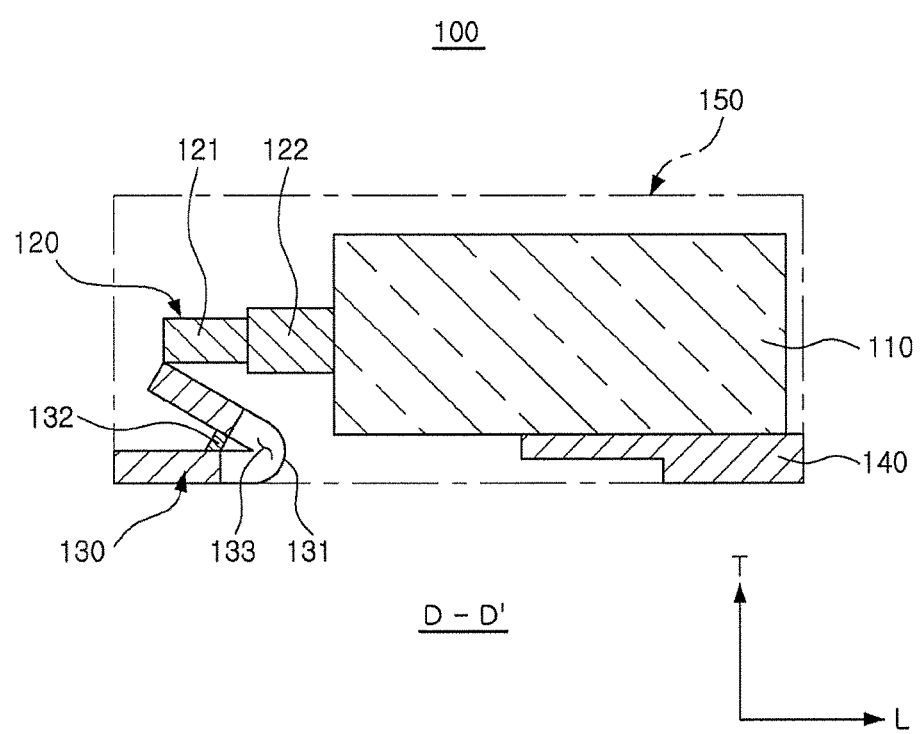
FIG. 9 is a cross-sectional view of the tantalum capacitor taken along line D-D' of FIG. 8.

FIG. 8 is a transparent perspective view of a tantalum capacitor 100 according to an exemplary embodiment in the present disclosure and FIG. 9 is a cross-sectional view of the tantalum capacitor 100 taken along line D-D' of FIG. 8.

Referring to FIGS. 8 and 9, the tantalum capacitor 100 according to an exemplary embodiment in the present disclosure may further include a support portion 132 and a groove portion 133 in the anode lead frame 130. Thereby, deformation and damage of the anode lead frame 130 may be prevented and short circuits of the anode lead frame 130 and the cathode part 122 of the tantalum wire 120 may be prevented.

Method of Manufacturing Tantalum Capacitor

Figure 10A:
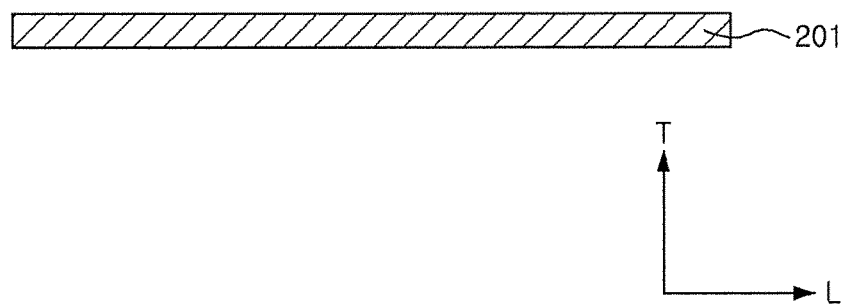
FIGS. 10A through 10F are views illustrating a method of manufacturing a tantalum capacitor according to an exemplary embodiment in the present disclosure.
Figure 10B:
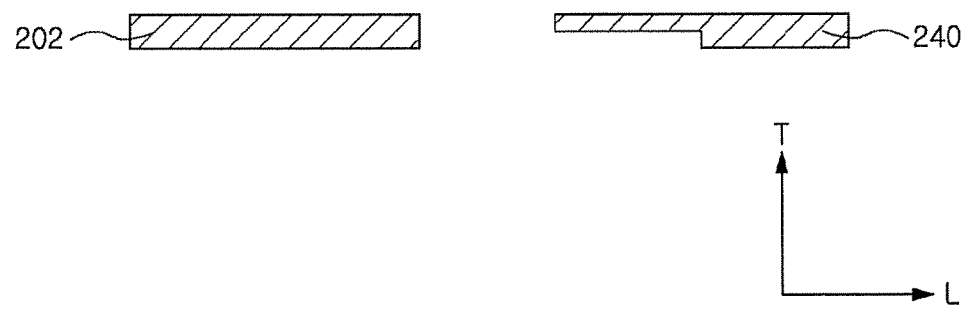
Figure 10C:
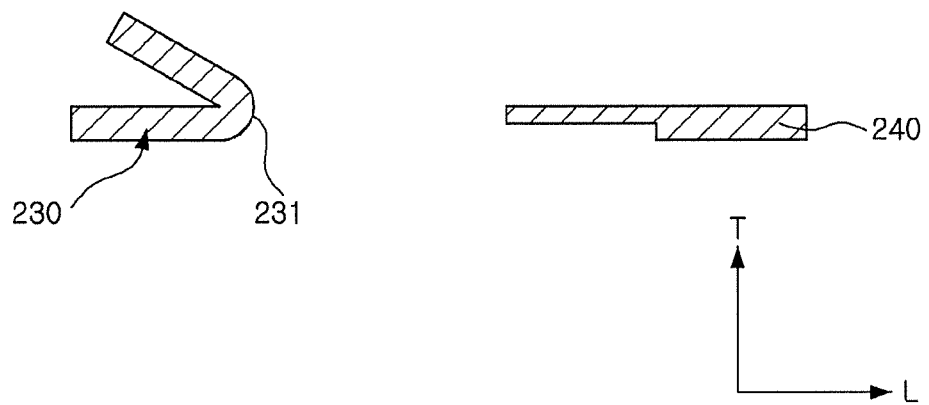
Figure 10D:
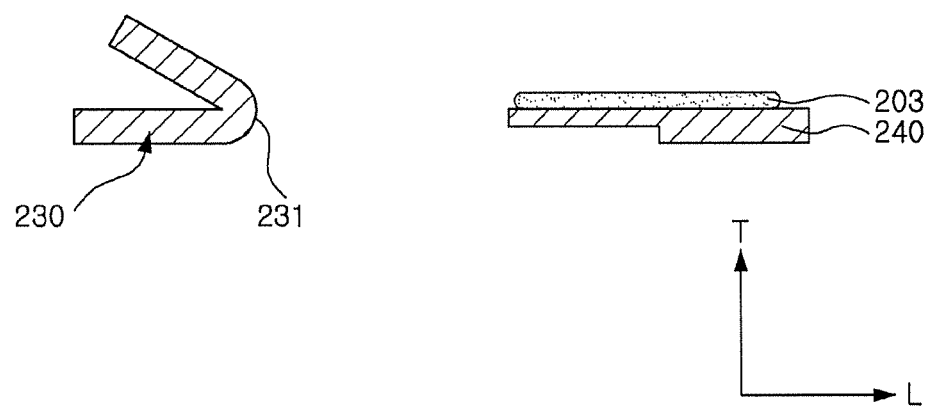
Figure 10E:
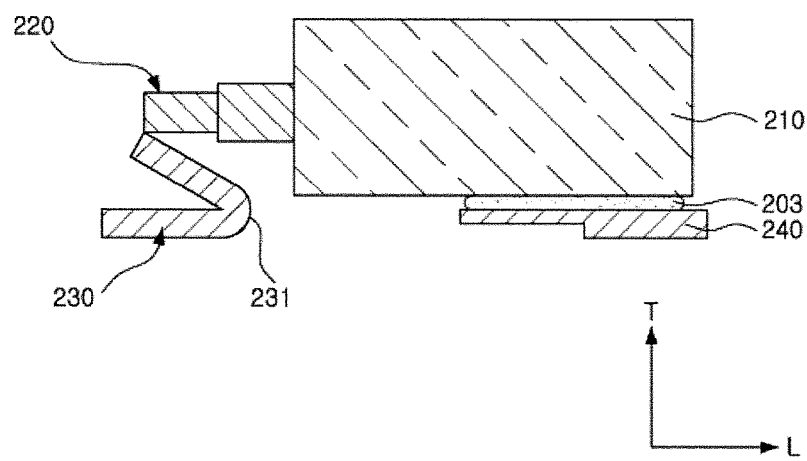
Figure 10F:
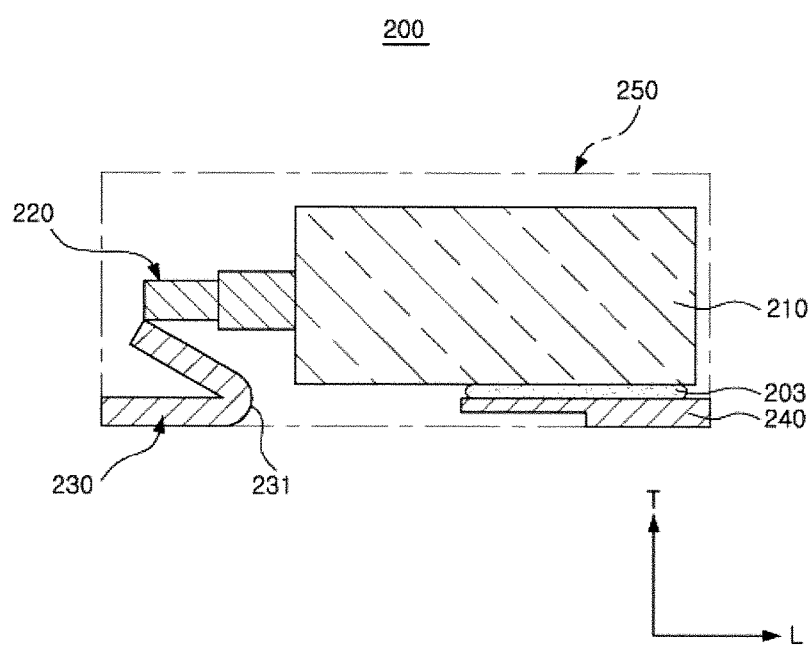
Figure 11A:
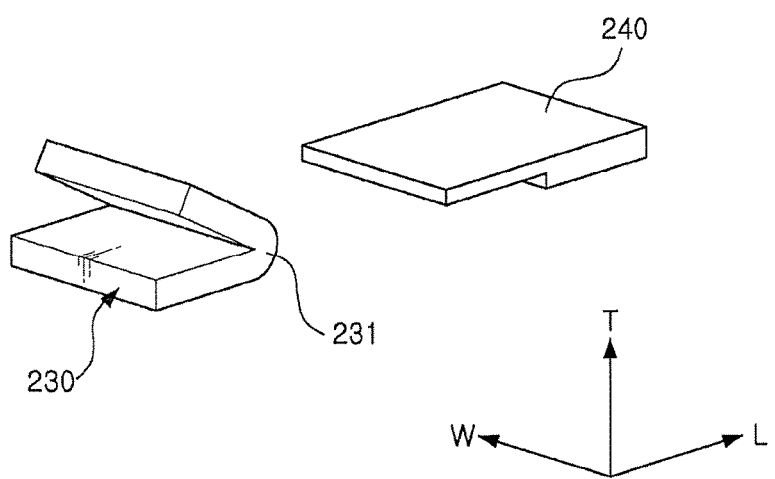
FIGS. 11A through 11D are perspective views illustrating an anode lead frame and a cathode lead frame of the tantalum capacitor according to the exemplary embodiment in the present disclosure.
Figure 11B:
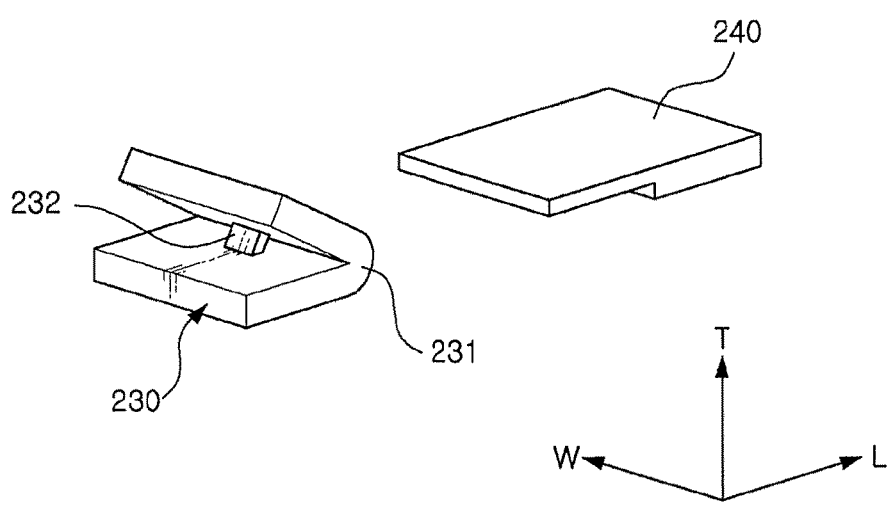
Figure 11C:
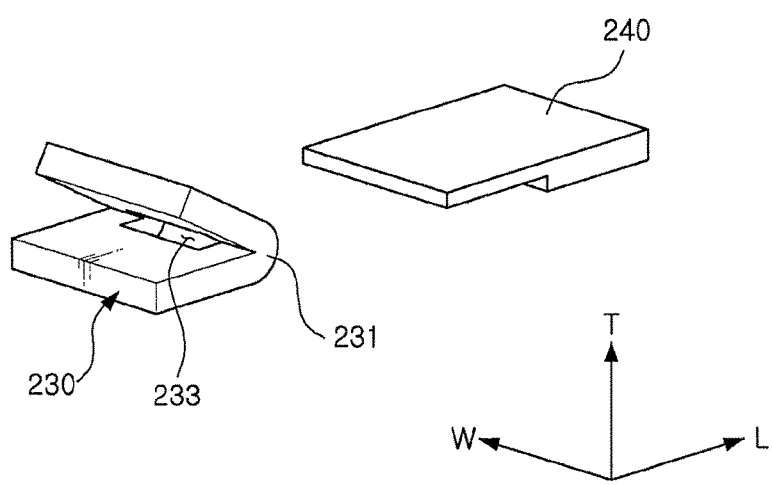
Figure 11D:
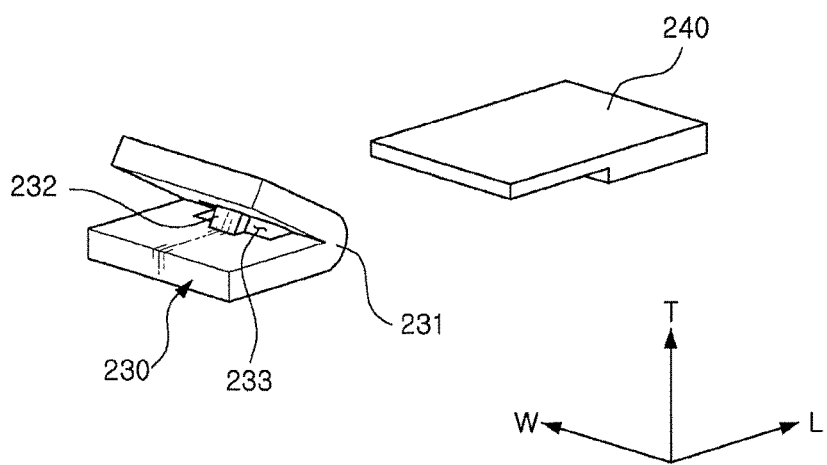
Figure 12:
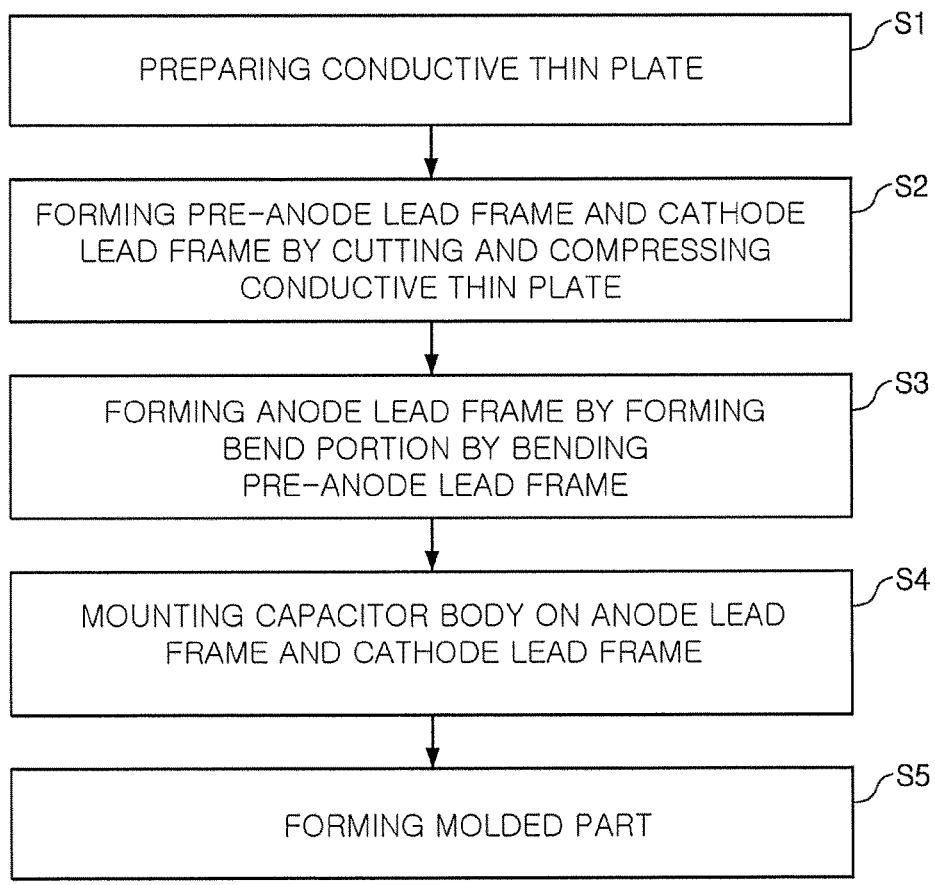
FIG. 12 is a flowchart of the method of manufacturing the tantalum capacitor according to the exemplary embodiment in the present disclosure.

FIGS. 10A through 10F are views illustrating a method of manufacturing a tantalum capacitor 200 according to an exemplary embodiment in the present disclosure, FIGS. 11A through 11D are perspective views illustrating an anode lead frame 230 and a cathode lead frame 240 of the tantalum capacitor 200 according to the exemplary embodiment in the present disclosure, and FIG. 12 is a flowchart of the method of manufacturing the tantalum capacitor 200 according to the exemplary embodiment in the present disclosure.

Referring to FIGS. 10A through 12, a method of manufacturing a tantalum capacitor 200 according to an exemplary embodiment in the present disclosure may include an operation S1 of preparing a conductive thin plate 201, an operation S2 of forming a pre-anode lead frame 202 and a cathode lead frame 240 by cutting and compressing the conductive thin plate 201, an operation S3 of forming an anode lead frame 230 by forming a bend portion 231 by bending the pre-anode lead frame 202, an operation S4 of mounting a capacitor body having a tantalum wire 220 protruded from one surface thereof on the anode lead frame 230 and the cathode lead frame 240, and an operation S5 of forming a molded part 250 to surround the capacitor body and the tantalum wire 220.

FIG. 10A illustrates the conductive thin plate 201 (S1), a material for manufacturing the anode lead frame 230 and the cathode lead frame 240. As the conductive thin plate 201, a conductive metal such as a nickel/iron alloy, or the like, may be used.

Next, the pre-anode lead frame 202 and the cathode lead frame 240 may be formed by cutting and compressing the conductive thin plate 201 (S2), and the anode lead frame 230 may be formed by forming the bend portion 231 by bending the pre-anode lead frame 202 (S3).

FIG. 10B illustrates a case in which the pre-anode lead frame 202 and the cathode lead frame 240 are formed by cutting and compressing the conductive thin plate 201. The pre-anode lead frame 202 and the cathode lead frame 240 may be cut to an appropriate length by taking a size of the capacitor body to be mounted on the pre-anode lead frame 202 and the cathode lead frame 240 and a size of the tantalum capacitor 200 into account. In addition, in order to increase adhesive strength with the capacitor body, a special shape may be formed to be compressed on the mounting surface of the anode lead frame 230 and the cathode lead frame 240, and a groove may be formed to improve strength of the anode lead frame 230 and the cathode lead frame 240. According to the present process, the anode lead frame 230 and the cathode lead frame 240 may be formed by a single cutting and compressing process. As a result, the process may be simplified and manufacturing costs may be reduced.

FIG. 10C illustrates a case in which the anode lead frame 230 is formed by forming the bend portion 231 by bending the pre-anode lead frame 202. Since a separate welding process is not required to form the anode lead frame 230, the manufacturing process may be simplified and manufacturing costs may be reduced. In addition, defects according to the welding process described above may not occur, and a small tantalum capacitor 200 may also be easily manufactured.

The acute angle formed in the anode lead frame 230 by the bend portion 231 may be 80° or less. As described above, the capacitor body may be stably mounted by disposing the bend portion 231 so that the bent angle of the bend portion 231 is acute angle of 80° or less.

FIGS. 11A through 11D are perspective views illustrating the anode lead frame 230 and the cathode lead frame 240 according to various exemplary embodiments in the present disclosure.

FIG. 11A illustrates the anode lead frame 230 that does not include a support portion 232 and a groove portion 233. FIG. 11B illustrates the anode lead frame 230 that further includes the support portion 232 in a surface forming the acute angle by the bend portion 231. The support portion 232 may be formed integrally with the pre-anode lead frame 202 and the cathode lead frame 240 by a single process at the time of the compressing process in which the pre-anode lead frame 202 and the cathode lead frame 240 are formed. In this case, the process may be simplified and manufacturing costs may be reduced. In addition, the support portion 232 may be formed by bonding a structure of a separate support portion 232 on the pre-anode lead frame 202 by a welding or bonding process after the pre-anode lead frame 202 and the cathode lead frame 240 are formed.

FIG. 11C illustrates the anode lead frame 11 including the groove portion 233. The groove portion 233 may be formed integrally with the pre-anode lead frame 202 and the cathode lead frame 240 by a single process at the time of the cutting process in which the pre-anode lead frame 202 and the cathode lead frame 240 are formed. In this case, the process may be simplified and manufacturing costs may be reduced. After the pre-anode lead frame 202, the groove portion 233, and the cathode lead frame 240 are formed by cutting and compressing the conductive thin plate 201, the anode lead frame 230 may be formed by forming the bend portion 231 by bending a portion in which the groove portion 233 is disposed. In this case, since the groove portion 233 becomes a reference for forming the bend portion 231, the process may be simplified.

FIG. 11D illustrates the anode lead frame 230 including the support portion 232 and the groove portion 233. The support portion 232 and the groove portion 233 may be formed integrally with the pre-anode lead frame 202 and the cathode lead frame 240 by a single process at the time of the compressing process in which the pre-anode lead frame 202 and the cathode lead frame 240 are formed. In this case, the process may be simplified and manufacturing costs may be reduced. Alternatively, a process of forming the support portion 232 by cutting a region corresponding to the groove portion 233 simultaneously with the cutting process in which the pre-anode lead frame 202 and the cathode lead frame 240 are formed, and then bending the cut region may be further included. In addition, the support portion 232 may be formed by bonding a structure of a separate support portion 232 on the pre-anode lead frame 202 by a welding or bonding process after the pre-anode lead frame 202, the groove portion 233, and the cathode lead frame 240 are formed.

In a case in which the anode lead frame 230 is formed by bending the pre-anode lead frame 202 after the support portion 232 is formed on the pre-anode lead frame 202, the support portion 232 may become a reference of the acute angle formed by the bend portion 231. In order to increase product reliability in the tantalum capacitor 200, the bend portion 231 of the anode lead frame 230 may need to be uniformly bent at a predetermined angle. In a case in which the support portion 232 is disposed on the pre-anode lead frame 202, since the pre-anode lead frame 202 may be bent until one surface thereof is in contact with the support portion 232, the angle of the bend portion 231 of the anode lead frame 230 may be uniformly maintained. In addition, thereafter, when the capacitor body is mounted, a case in which pressure is applied to the anode lead frame 230 by the tantalum wire 220 of the capacitor body and is deformed may be prevented.

Next, the capacitor body in which the tantalum wire 220 is disposed on one surface thereof may be mounted on upper surfaces of the anode lead frame 230 and the cathode lead frame 240 (S4). The anode lead frame 230 and the cathode lead frame 240 may be disposed to be parallel to each other and to horizontally face each other. In this case, portions of thermal resistance tape may be attached to lower surfaces of the anode and cathode lead frames 230 and 240 for the connection thereof. The portions of thermal resistance tape are to prevent surfaces of the anode and cathode lead frames 230 and 240 from being contaminated in a subsequently-performed molding process.

When the capacitor body is mounted on an upper surface of a front end portion of the cathode lead frame 240 and the tantalum wire 220 of the capacitor body is in contact with the anode lead frame 230, the tantalum wire 220 and the anode lead frame 230 may be electrically attached to each other by performing spot welding or laser welding, or applying a conductive adhesive. Here, as illustrated in FIG. 10D, a conductive adhesive layer 203 having a predetermined thickness is formed by applying the conductive adhesive to a mounting part of the cathode lead frame 240 in advance before the capacitor body is mounted, whereby fixing strength between the cathode lead frame 240 and the capacitor body may be improved. In order to cure the above-mentioned conductive adhesive layer 203, a process of curing the conductive adhesive layer 203 at a temperature of about 100 to 200° C. may be performed. FIG. 10E illustrates a manner in which the capacitor body is mounted on the anode lead frame 230 and the cathode lead frame 240.

On the basis of a length direction of the capacitor body, when the bend portion 231 of the anode lead frame 230 is disposed to be closer to the capacitor body than a portion to which the anode lead frame 230 and the tantalum wire 220 are connected, since the anode lead frame 230 may be disposed in the narrower space, a high capacitance tantalum capacitor 200 may be provided.

Next, as illustrated in FIG. 10F, the molded part 250 may be formed to surround the capacitor body and the tantalum wire 220 and expose one surface of each of the anode lead frame 230 and the cathode lead frame 240 externally (S5). The molded part 250 may serve to protect the tantalum wire 220 and the capacitor body externally.

When the molded part 250 is formed, the portions of thermal resistance tapes attached to the lower surfaces of the anode lead frame 230 and the cathode lead frame 240 may be removed.

By the above-mentioned processes, the tantalum capacitor 200 according to the exemplary embodiment in the present disclosure may be manufactured.

As set forth above, according to exemplary embodiments in the present disclosure, the tantalum capacitor may reduce the defect occurrence, improve product properties, reduce manufacturing costs, and miniaturize the product due to the simple manufacturing process by forming the anode lead frame without the welding process and integrally forming the anode lead frame and the cathode lead frame.

While exemplary embodiments have been shown and described above, it will be apparent to those skilled in the art that modifications and variations could be made without departing from the scope of the present inventive concept as defined by the appended claims.

What is claimed is:

1. A tantalum capacitor comprising:
a capacitor body;
a tantalum wire protruding from one surface of the capacitor body and having an anode part and a cathode part;
a molded part enclosing the capacitor body and the tantalum wire;
an anode lead frame inclinedly contacting the tantalum wire, bent only once in a lengthwise direction of the tantalum wire, and exposed to an outer surface of the molded part; and
a cathode lead frame disposed on an outer surface of the capacitor body and exposed to the outer surface of the molded part,
wherein the anode lead frame includes a bend portion,
wherein the bend portion has an acute angle of 80° or less,
wherein the anode lead frame further includes a groove portion having a width greater than a width of the tantalum wire,
wherein the anode part of the tantalum wire is in direct contact with the anode lead frame, and
wherein the cathode part of the tantalum wire is disposed to be spaced apart from the anode lead frame and overlaps the groove portion from a viewpoint in a vertical direction perpendicular to a direction in which the tantalum wire extends from the capacitor body.

2. The tantalum capacitor of claim 1, wherein the bend portion is disposed to be closer to the capacitor body than a portion in which the anode lead frame and the tantalum wire are connected, on the basis of a length direction of the capacitor body.

3. The tantalum capacitor of claim 1, further comprising a support portion disposed on a surface of the anode lead frame.

4. The tantalum capacitor of claim 3, wherein the support portion is disposed on at least one surface of a surface of the anode lead frame disposed in a width-length plane of the capacitor body and a surface of the anode lead frame forming an acute angle with the surface disposed in the width-length plane of the capacitor body, among surfaces of the anode lead frame forming the acute angle.

5. The tantalum capacitor of claim 4, wherein the support portion is in contact with both the surface of the anode lead frame disposed in the width-length plane of the capacitor body and the surface of the anode lead frame forming the acute angle with the surface disposed in the width-length plane of the capacitor body.

6. A tantalum capacitor comprising:
a capacitor body;
a tantalum wire protruding from one surface of the capacitor body;
a molded part enclosing the capacitor body, the tantalum wire, and a support portion;
an anode lead frame inclinedly contacting the tantalum wire, bent only once in a lengthwise direction of the tantalum wire, and exposed to an outer surface of the molded part; and
a cathode lead frame disposed on an outer surface of the capacitor body and exposed to the outer surface of the molded part,
wherein the anode lead frame includes a bend portion,
wherein the bend portion has an acute angle of 80° or less, and
wherein the support portion is disposed on a surface of the anode lead frame with a protruding shape, and disposed between an upper surface of the anode lead frame and the bend portion.

7. The tantalum capacitor of claim 6, wherein the bend portion is disposed to be closer to the capacitor body than a portion in which the anode lead frame and the tantalum wire are connected, on the basis of a length direction of the capacitor body.

8. The tantalum capacitor of claim 6, wherein the support portion is disposed on at least one surface of a surface of the anode lead frame disposed in a width-length plane of the capacitor body and a surface of the anode lead frame forming an acute angle with the surface disposed in the width-length plane of the capacitor body, among surfaces of the anode lead frame forming the acute angle.

9. The tantalum capacitor of claim 8, wherein the support portion is in contact with both the surface of the anode lead frame disposed in the width-length plane of the capacitor body and the surface of the anode lead frame forming the acute angle with the surface disposed in the width-length plane of the capacitor body.

10. The tantalum capacitor of claim 6, further comprising a groove portion disposed in the anode lead frame.

11. The tantalum capacitor of claim 10, wherein the groove portion has a width greater than a width of the tantalum wire.

* * * * *